Feb. 8, 1944.   J. O. WILLIAMSON   2,340,917
WEEDER
Filed Nov. 12, 1941
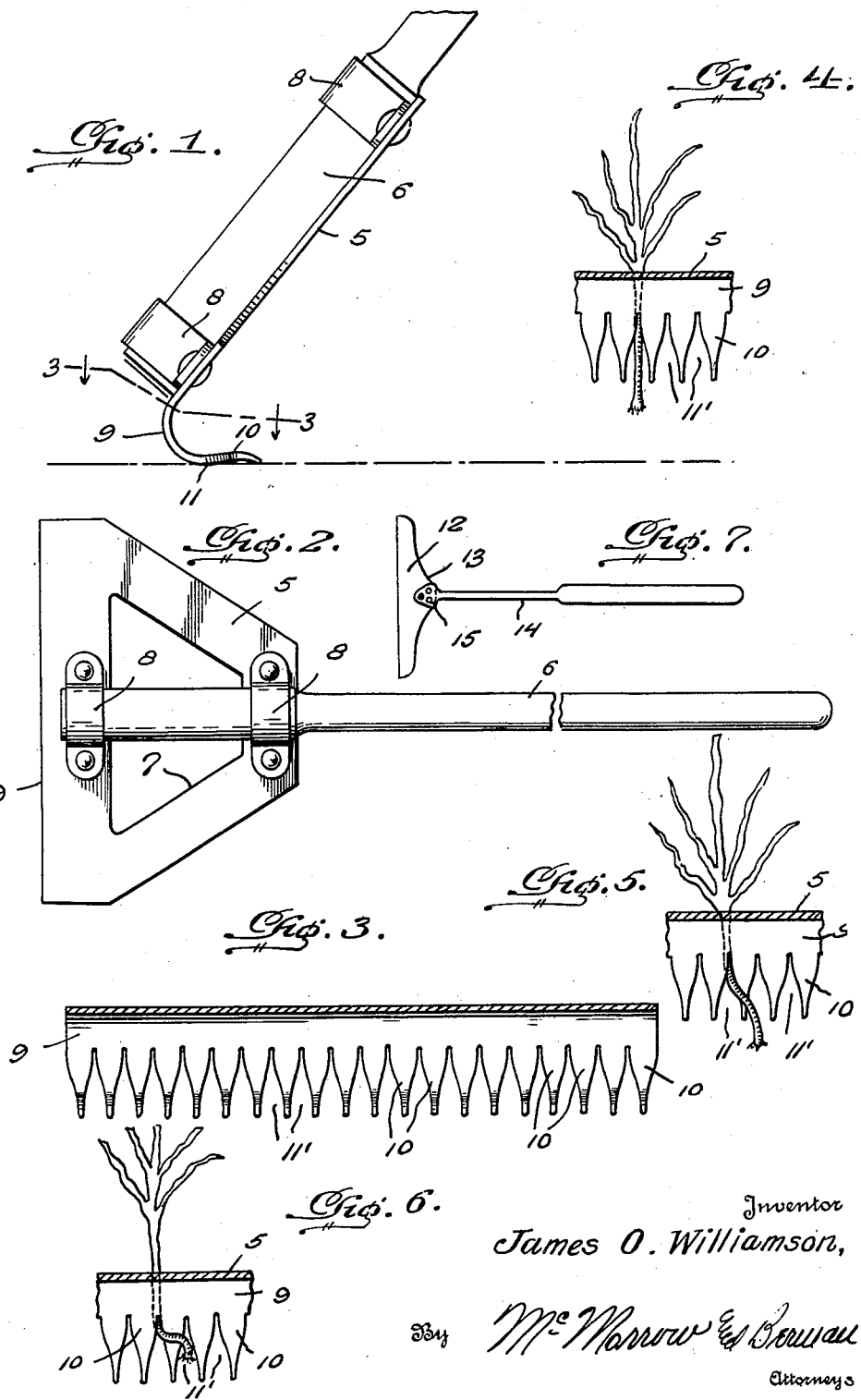
Inventor
James O. Williamson, Patented Feb. 8, 1944

2,340,917

UNITED STATES PATENT OFFICE 2,340,917

WEEDER

James O. Williamson, Medicine Hat, Alberta, Canada

Application November 12, 1941, Serial No. 418,811

1 Claim. (Cl. 97—63)

This invention relates to weeders, and has for the primary object the provision of a hand tool especially adapted for extracting weeds by the roots and such weeds that have perpendicular stalks and includes a construction which will permit the use of the device without endangering other growths and allows a firm grip to be obtained on the stalk of the weed to be extracted, so that when pulled away from the ground along with its root, the danger of the device slipping from the weed will be entirely eliminated, also the construction of the device permits pulling of one or more weeds at a time.

Another object of this invention is the provision of a tool of the above stated character which may be used by a person in a natural standing position with push, pull and transverse movements thereto, the push movement or motion being used to level upstanding weeds and bring the stalks thereof into position of being gripped when the device is moved transversely and to extract the weeds on the pull motion, thus permitting the person to remove undesirable growing weeds rapidly and efficiently without undue tiring strain.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary side elevation illustrating a weeder or tool in operative position and constructed in accordance with my invention.

Figure 2 is a top plan view illustrating the device.

Figure 3 is a transverse sectional view taken on the line 3—3 of Figure 1.

Figure 4 is a fragmentary sectional view showing the position of the tool when first brought to engage with a weed or similar growth.

Figure 5 is a view similar to Figure 4 showing the position occupied by the tool in the initial bringing about of securing the weed to the tool.

Figure 6 is a view similar to Figures 4 and 5 showing the weed completely caught or anchored in the tool.

Figure 7 is a top plan view illustrating a modified form of my invention.

Referring in detail to the drawing, the numeral 5 indicates the head of the tool, 6 the handle which may be of any desired length to permit a person when in standing position to bring the tool into engagement with the ground, as shown in Figure 1, and to impart thereto with ease a push motion, a transverse motion and a pull motion without a tiring effect.

The head 5 in this instance is in the form of a plate which decreases in width toward one end and is provided with a cutout 7 to reduce the weight thereof. The handle has a double point connection with the plate by clamps or brackets 8 or other suitable securing means, a portion of the handle traversing the cutout 7 and being secured to said plate at opposite ends of the cutout.

The plate when applied to the handle protrudes a limited distance beyond the non-grip end of the handle and is bent or curved to form a bumper portion 9 extending transversely of the plate and for the entire width thereof. Teeth 10 are formed integrally with the plate along the free transverse edge of the bumper portion and act as runners for the head when moved in the direction above specified with respect to the ground and the growth to be pulled. Each tooth has a compound curvature thereto providing a portion 11 to ride against the surface of the ground with the free end curving toward the ground to have a scraping action on the surface of the ground.

The teeth provide therebetween notches 11' of considerable depth. Said teeth are comparatively wide at the formation thereof on the bumper portion of the head or plate and gradually decrease in width for a limited distance from the attached ends thereof to render the notches restricted at their inner ends for gripping stalks of weeds and other growth with a tight wedging action. In other words, the restriction of the notches will bring about firm wedging of the stalk therein.

The teeth from a limited distance of their formation on the head 5 decrease in width to a greater extent towards the free ends thereof to provide comparatively wide mouths to the notches so that stalks may readily enter the notches and be gripped in the restricted inner ends of the notches.

In use, the person in a standing position brings the tool to rest on the ground as shown in Figure 1, so that the bumper portion is sufficiently spaced from the ground to abut standing stalks a distance above the ground to assure bending over of the stalks toward the ground by said bumper portion as the head is moved forwardly by the person. The stalks bending over as stated enter the notches as suggested in Figure 4. The head is then moved transversely with the portions 11 of the teeth still riding the ground bringing the stalks in position extending across teeth as suggested in Figure 5 beginning the tying of the stalks to the head. The head is then pulled toward the user, bringing the stalks in the position of each being located in a pair of notches and to tightly wedge in the restricted ends of the notches and as suggested in Figure 6, so that on a further pull by the user, the stalks are pulled or extracted from the ground along with the roots thereof.

Thus it will be seen that through the use of the tool as described, the stalks of the weeds become firmly caught by the teeth and notches and with a substantially tying arrangement therewith which prevents pulling or slipping of the stalks loose therefrom during the final extracting operation thereof from the ground.

Also it will be seen that the tool is compact, durable and light in weight, rendering its use easy and convenient and with manual effort reduced to a minimum.

As shown in Figure 7 the head 5 may not necessarily take on the shape described and shown in Figure 2, but may be of elongated formation, as shown at 12, and provided with an extension 13 intermediate its ends to which a handle 14 may be secured, as at 14. Otherwise the head 12 is constructed in accordance with the head 5, that is, it has the same construction of bumper portion, teeth and notches as described in connection with the head 5.

While I have shown and described the preferred embodiment of my invention, it will be understood that minor changes in construction, combination and arrangement of parts may be made without departing from the spirit and scope of the invention as claimed.

Having thus described my invention, what I claim is:

In a weeding tool, a handle, a transversely elongated head on said handle forming a bumper for engaging and bending over the stalks of weeds during forward motion of the head, said bumper, in side elevation, being rounded forwardly with its rear adapted to engage the ground and having a plurality of laterally spaced teeth on the rear edge thereof, said teeth being arched with the front portions thereof extending upwardly and rearwardly from the bumper, rear portions extending downwardly and rearwardly to engage the ground while the bumper engages the ground, and gently curved intermediate portions, said teeth, in plan view, being generally Y-shaped with curved, dull edges, the edges of the front portions of adjacent teeth being gradually divergent from one another to define elongated, narrow slots adapted to hold stalks fitted therein upon forward motion of the tool over the bases of the weeds, the edges of the intermediate portions being sharply divergent, and the edges of the rear portions being gradually divergent, whereby said rear portions form elongated, narrow, ground-engaging tines adapted to scrape the ground and gouge under the loops of stalks between the roots thereof and the portions fitted in the elongated, narrow portions of the slots when said tool, after said forward motion, is slid laterally and then pulled rearwardly, whereby to wedge the stalks in said slots and then to pull out said weeds by their roots without cutting.

JAMES O. WILLIAMSON.